United States Patent [19]

Breisch

[11] Patent Number: 4,457,399

[45] Date of Patent: Jul. 3, 1984

[54] WORK SUPPORT UNIT

[75] Inventor: John H. Breisch, Lakewood, Ohio

[73] Assignee: Patterson & Patterson, Inc., Cleveland, Ohio

[21] Appl. No.: 470,173

[22] Filed: Feb. 28, 1983

[51] Int. Cl.³ ...................... B27B 21/00; A47B 37/00; F16M 11/00

[52] U.S. Cl. .................................... 182/185; 182/151; 182/224

[58] Field of Search ............... 182/181, 182, 183, 184, 182/185, 224, 225, 226, 153, 151; 248/163 R, 165; 269/98, 902

[56] References Cited

U.S. PATENT DOCUMENTS

| | | | |
|---|---|---|---|
| 488,349 | 12/1892 | Bradley | 182/185 |
| 1,408,675 | 3/1922 | Wimberg | 182/181 |
| 1,458,738 | 6/1923 | Teeken | 182/181 |
| 1,553,045 | 9/1925 | Jones | 182/184 |
| 2,652,079 | 9/1953 | Worthen | 182/181 |
| 2,812,219 | 11/1957 | Lange | 182/185 |
| 3,175,642 | 3/1965 | Neeley | 182/185 |
| 3,763,958 | 10/1973 | Hanson | 182/181 |
| 4,014,405 | 3/1977 | Breisch | 182/181 |
| 4,121,814 | 10/1978 | Prior | 269/69 |
| 4,258,907 | 3/1981 | Roberts | 269/69 |

FOREIGN PATENT DOCUMENTS

| | | | |
|---|---|---|---|
| 1131219 | 9/1955 | France | 182/185 |
| 706207 | 5/1966 | Italy | 182/181 |

*Primary Examiner*—R. P. Machado

*Attorney, Agent, or Firm*—Pearne, Gordon, Sessions, McCoy, Granger & Tilberry

[57] ABSTRACT

A work support unit convertible between work horse and buck horse modes, the unit comprising a set of three generally horizontal cross bars, four depending legs and bracket means coupling the cross bars and legs and maintaining the same in a fixed spatial relationship. In the work horse mode, a replaceable work board is secured to cross bars to provide a working surface and in the buck horse mode the board is removed. In a knock-down condition for transport and/or storage the legs are removed from the brackets and are conveniently strapped to the cross bars.

11 Claims, 8 Drawing Figures

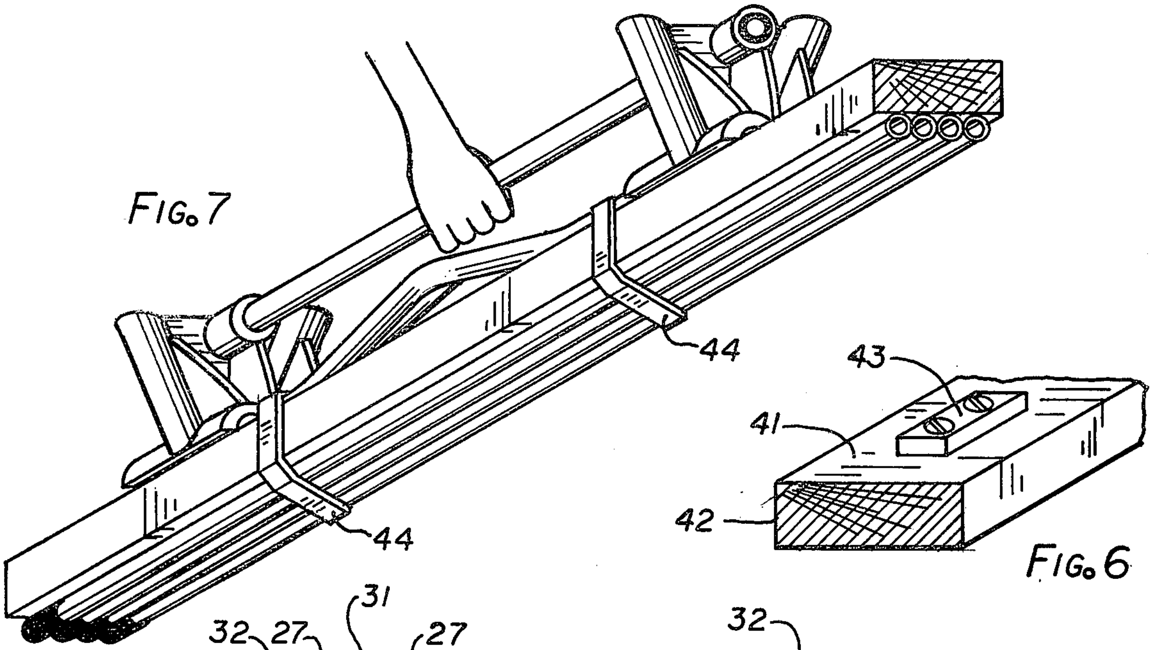
FIG. 7
FIG. 6
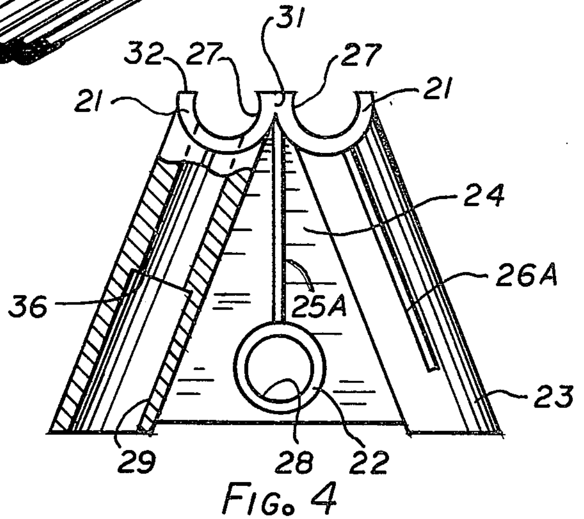
FIG. 4
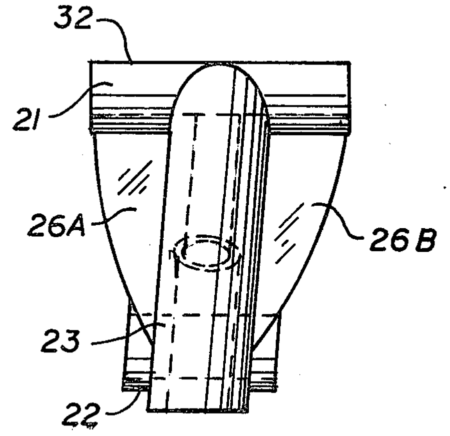
FIG. 5
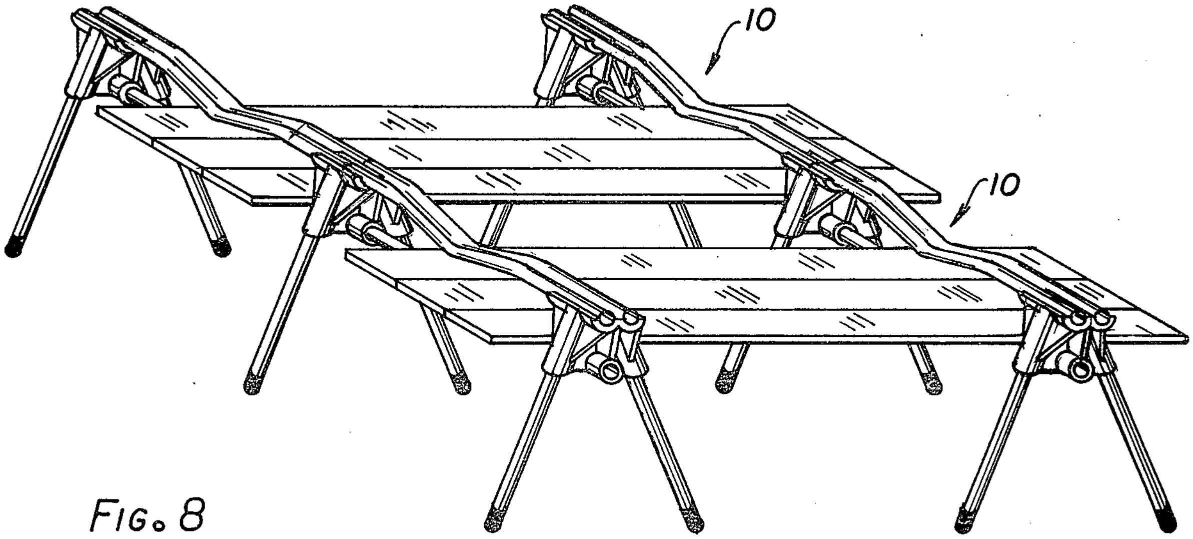
FIG. 8

WORK SUPPORT UNIT

BACKGROUND OF THE INVENTION

The invention relates to work supporting horses and, in particular, it pertains to a knockdown type of such a device.

Prior Art

Factory-produced, knockdown work supporting horses are known, for example, from U.S. Pat. No. 2,652,079 to Worthen; U.S. Pat. No. 3,763,958 to Hanson; U.S. Pat. No. 4,014,405 to Breisch; U.S. Pat. No. 4,121,814 to Prior; and U.S. Pat. No. 4,258,907 to Roberts et al. Various such prior units have ordinarily afforded a limited number of features but, in general, because of design limitations, have compromised one or more other recognized desirable features. For example, a unit which affords a relatively high degree of rigidity often sacrifices light weight, economy, or simplicity in set up. Additionally, prior art work supporting horses have often not provided ready convertibility between a sawhorse and sawbuck.

SUMMARY OF THE INVENTION

The invention provides a knockdown work support which is readily convertible between a sawhorse, a sawbuck, or a two-level scaffold. The work support is an assembly of simple bar stock, preferably tubular steel, coupled by a pair of end brackets. In assembly, the unit comprises three horizontal bars extending between the brackets and a pair of divergent legs associated with each bracket.

The work support unit affords a high level of convenience and versatility to the user. From its knocked down condition, the work support unit is easily set up by simply inserting its four legs into individual recesses provided by the brackets. The recesses are arranged to retain the legs by a friction fit without the use of tools or separate fastening elements. Assembly of the legs, further, does not require secondary manipulative steps. The unit is easily handled and transported by a user as a result of its light weight, limited bulk, and, in particular, the usefulness of one of the horizontal bars as a convenient and comfortable carrying handle.

In addition to convenience to the user, the disclosed work support unit is economical to manufacture because it incorporates standardized tubing stock which, besides being cut to length, requires a minimum of fabrication steps. The end brackets, which ideally are identical, can, for example, be molded or cast to finished shape without secondary machining operations.

In its sawhorse mode, the unit is adapted to support a replaceable wooden work board for a working surface. The work board is carried on an upper pair of the horizontal bars of the unit which lie in a common horizontal plane. These upper bars are spaced apart to provide a suitable base for the work board. The board is removably retained on the upper bars, for example, by lug elements screwed or otherwise fastened to the lower face of the work board and frictionally pinched between upper cross bars. The wooden work surface protects the upper cross bars from accidental saw cuts, and may be easily replaced when it is heavily worn or accidentally damaged. Without the wooden work board in place and the upper pair of cross bars exposed, the work support unit serves as a sturdy buckhorse. The upper bars at their midsections are bent into a shallow V-shape to hold cylindrical objects, such as logs, in a stable, elevated position for cutting into firewood or the like. The work support unit alternatively can serve as a two-level scaffold, either at the height of the work board or at the height of a lower, horizontal cross bar. Moreover, the end brackets can be arranged to permit ganging of the work units whereby horizontal cross bar sets are arranged in tandem and share a common bracket and pair of legs.

BRIEF DESCRIPTION OF THE DRAWINGS

FIG. 4 is an end view of an end bracket partially in section used in the assembly of the work support unit.

FIG. 5 is a side view of the end bracket.

FIG. 6 is a fragmentary, perspective view of the underside of a work board illustrating a friction block secured thereto, used to mount the work board on the work support unit.

FIG. 7 is a perspective view of the work support unit in a knockdown, inverted transport and storage condition.

FIG. 8 is a perspective view of several work support units in ganged relation.

DETAILED DESCRIPTION OF THE PREFERRED EMBODIMENT

Figure 1:
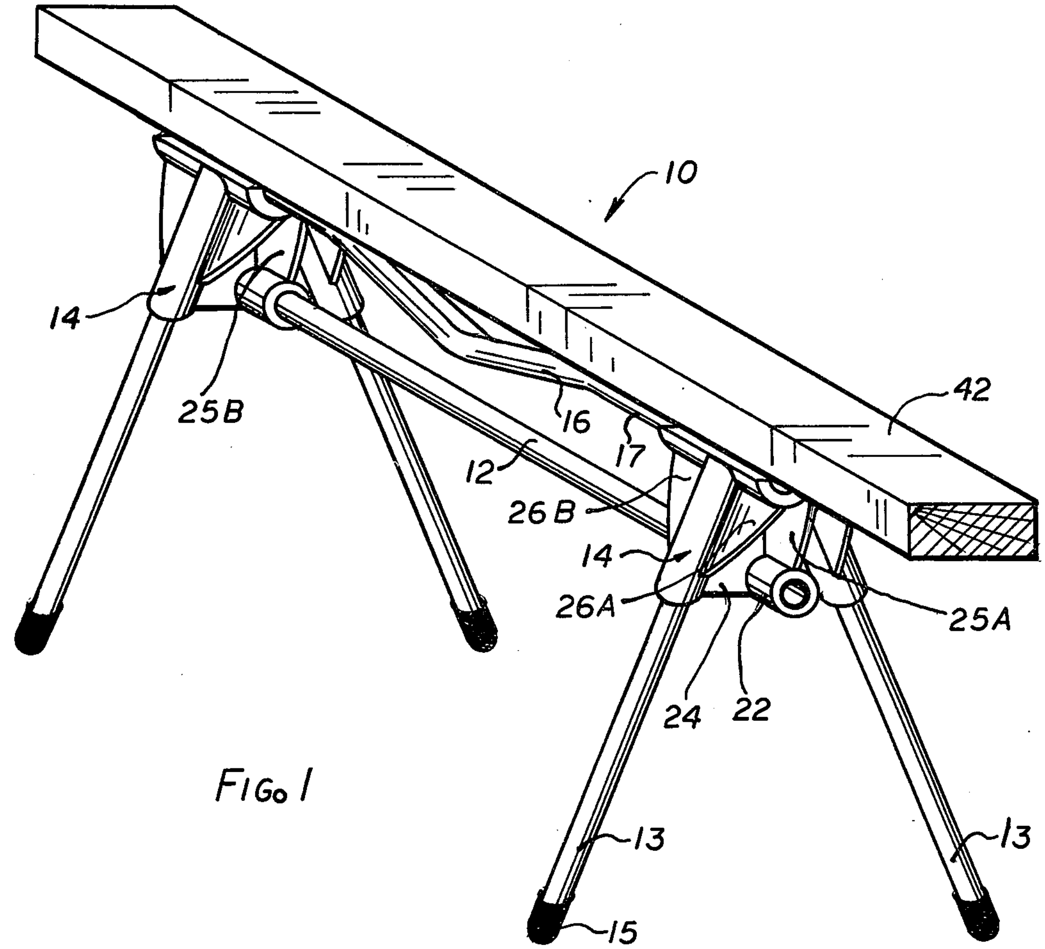
FIG. 1 is a perspective view of a work support unit constructed in accordance with the invention.

Referring now to the drawings, there is illustrated a work support unit 10 which comprises a set of three generally horizontal cross bars 11, 12 and four legs 13. At their ends, the cross bars 11, 12 are coupled to pairs of legs 13 by brackets 14. Preferably, the cross bars 11,12 and legs 13 are formed of round steel tubing such as cold-rolled, commercial quality electric welded, zinc-plated steel tubing. In one example, such tubing is 1" O.D. 22 gauge; the legs are approximately 26½ inches long, and the overall length of the cross bars, measured in a straight line from their end faces, is approximately 30 inches. The legs 13 and lower cross bar 12 require essentially no fabrication beyond that of being cut to the desired length. The lower ends of the legs 13 are fitted with elastomeric cups 15, in a conventional manner, to improve their frictional characteristics and to distribute the weight carried by the unit 10. The upper pair of cross bars 11, besides being cut to an appropriate length, are bent into a shallow V-shape in their midsections 16. End areas 17 of the upper cross bars 11 remain straight and coaxial for a significant distance, for example, one-quarter of the overall length of the cross bar.

The brackets 14 preferably are identical. Each bracket 14 ideally is a molded or cast integral body of suitable material, such as aluminum, zinc, or reinforced plastic. The bracket 14 comprises a plurality of generally cylindrical bosses 21, 22, and 23 corresponding to the three cross bars and two legs. The bosses 21–23 are joined by mutual abutments and intervening webs 24, 25A and 25B, 26A and 26B. The webs 24–26, which are of generally uniform thickness, serve to reinforce and rigidify the bracket 14, and thereby maintain the bosses 21–23 in their proper relative orientation when the bracket is stressed during use.

Each of the bracket bosses 21–23 provides a generally circular recess 27–29 for reception therein of either a cross bar 11,12 or leg 13. The recesses 27–29, which are preferably in finished condition when molded or cast, are dimensioned to provide a tight friction fit with the outside diameter of the bars 11,12 or legs 13. This is accomplished, for example, by providing the recesses or bores 27–29 with a slight taper of one-quarter degree, for example, so that they grow smaller with increasing distance from their entrance ends. The entrance of the recesses 27,29 are dimensioned slightly larger than the outside diameter of the bars 11,12 or legs 13 to facilitate insertion of such bars or legs into the recesses. The leg receiving recesses 29 are stepped approximately at mid-length to provide an annular shoulder 36, see FIG. 4 against which ends of the legs 13 can abut. For reasons explained below, each of the upper recesses 27 can be tapered, i.e., decreasing in diameter from both of its ends. The upper pair of bosses 21 are joined in Siamese fashion at abutting portions 31 of their sidewalls, and are truncated along a common horizontal plane at 32. The plane 32 is sufficiently displaced from the center or axis of the bosses 21 to ensure that the remaining boss sidewall areas envelope the associated cross bars 11 for substantially more than 180° of their circumferences.

Bosses 23 associated with the legs 13 are each paired with one of the horizontal truncated bosses 21 and have their upper ends abutting and merging with the mid-sections of such horizontal bosses. The leg bosses 23 lie in a plane which is canted slightly off the vertical in an angle of, for example, four degrees. The result of this canted plane is that, in assembly, the legs of one bracket are spaced an increasing distance from those of the other bracket with increasing distance from their respective bracket. Relative to one another, the leg bosses 23 diverge at an angle of 45 degrees, for example. The leg bosses 23 are joined by an intervening, triangular web 24, which lies centrally with respect to their common imaginary plane. At a lower region, the triangular web or skirt 24 carries the lower cross bar receiving boss 22. This lower boss 22 has its midsection generally centered in the triangular web 24. As shown, the lower cross bar boss 22 is parallel with the upper bosses 21 and is centered in an imaginary vertical plane that intersects the junction 31 between the upper bosses. Gussets or webs 25A, 25B lie in this imaginary vertical plane between the lower boss 22 and junction 31 so as to stabilize the lower boss and transversely reinforce the triangular web 24.

It can be seen and understood that each of the two leg bosses 23 and the lower central boss 22 are advantageously reinforced with the webs 24, 25A, 25B, and 26A, 26B in two mutually perpendicular planes for a high degree of strength and rigidity. The upper bosses 21 are mutually strengthened by each other at the junction 31 and all of the webs 24, 25A, 25B, and 26A, 26B. Each leg boss 23 is centered on an associated one of the upper cross bar bosses 21 such that the axis of the leg boss intersects the axis of the upper cross bar boss and bending moments due to axial compression forces in the legs are minimized.

Figure 2:
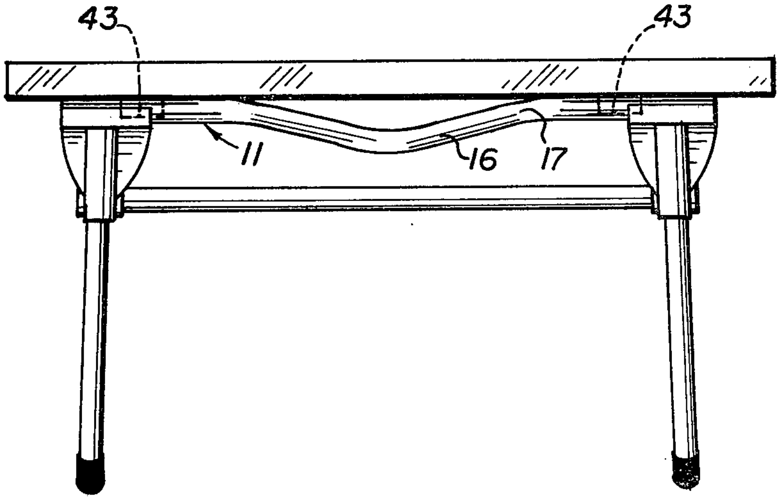
FIG. 2 is a side elevational view of the work support unit.
Figure 3:
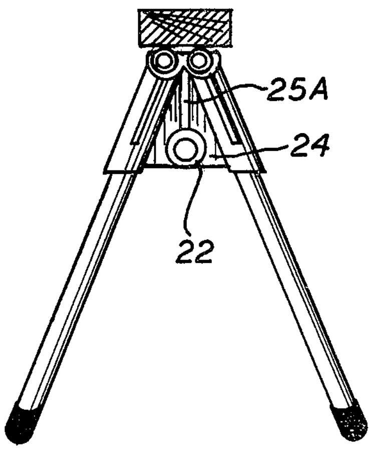
FIG. 3 is an end elevational view of the work support unit.

For most purposes, once the horizontal cross bars 11,12 are assembled with the pair of brackets 14, either by the manufacturer or by the ultimate user, these elements can remain coupled indefinitely. With this condition, knockdown of the unit 10 involves separation of the legs 13 from their associated bracket recesses 29. As shown, the truncation of the upper bosses 21 across the plane 32 allows the end portions 17 of the upper cross bars 11 to constitute the upper surfaces of the unit 10. The upper cross bars 11 are spaced horizontally from one another to provide a stable four-point, planar platform at the four lines of tangency between the straight bar end sections 17 and a lower face 41 of a work board 42. The work board 42 is, for example, a 3-foot length of 2″×4″ dimensional lumber. As indicated in FIGS. 2 and 6, the lower face 41 of the work board 42 is fitted with blocks or lugs 43 of wood or other suitable material. The lugs 43 in the illustrated case are screwed to the underside 41 of the board 42. The relative spacing between the blocks 43 is such that these blocks just fit in the spacing between the brackets 14 so as to prevent endwise movement of the work board 42 on the support unit 10. The blocks 43 are dimensioned to extend into the gap between the upper cross bars 11 with a sufficiently tight friction fit with such cross bars to retain the board 42 in place.

With the work board 42 in place, as indicated for example in FIG. 1, the unit provides a sturdy workhorse. The work board 42 protects the upper cross bars 11 from damage if a cut in an object supported on the board is too deep and penetrates the board. After heavy wear or other destruction, the board 42 is readily and economically replaced by prying it from the upper cross bars 11, transferring the blocks 43 to a new replacement board and resetting the new board on the upper cross bars.

The work board 42 also is removed from the upper bars 11 to use the unit 10 as a sawbuck. With the board 42 removed, the V-shaped center sections 16 of the upper cross bars 11 are useful in maintaining a cylindrical log in position for cutting it into small lengths suitable for use as firewood, for example. The unit 10 is also useful as a scaffold. The lower straight cross bar 12, as well as the work board 42 when in place, can be used to support a plank or load at their respective heights. It can be seen that the V-sections 16 of the cross bars 11 are sufficiently clear of the lower cross bar 12 to provide for clearance of a plank to be inserted between these elements.

FIG. 8 shows a unique feature of the disclosed bracket and cross bar system which permits the units 10 to be ganged. In this mode, tandem cross bar sets share a common bracket 14 and pair of legs 13. Since, as described before, the upper recesses 27 are tapered from both ends, the cross bars 11 can be positioned into such recesses from both ends.

The knockdown condition of the work support unit 10 is illustrated in FIG. 7. In this condition, the legs 13 are strapped to the work face of the board 42 by straps 44, which ideally have Velcro-type fasteners. The straps 44 are wrapped about the legs 13, board 42, and upper cross bars 11. This illustrated knockdown condition is one suitable way for marketing the unit 10, since it takes relatively little storage and shelf space. A desirable feature of the unit 10 in its knockdown form is the usefulness of the lower cross bar 12 as a convenient handgrip for the user in transporting the unit to and from a work site.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A bracket for a work supporting unit comprising a monolithic body for coupling a plurality of horizontal cross bars and a pair of legs and adapted to cooperate with a like bracket at the opposite end of said bars, the bracket including two upper recesses each individually adapted to receive one of a pair of horizontal upper cross bars in spaced parallel coplanar relation, a lower recess adapted to receive a third cross bar, the lower recesses being parallel to the upper recess and centered on a vertical plane midway between said upper recesses, and a pair of leg recesses, said leg recesses being in an imaginary plane slightly canted outwardly in a downward direction from a vertical plane, the leg recesses diverging from one another in a downward direction, and means rigidly interconnecting all of said cross bar and leg recesses.

2. A bracket as set forth in claim 1, wherein said upper recesses are truncated to a sufficient degree to permit the surfaces of the upper cross bars to constitute the upper surfaces of the work supporting unit.

3. A bracket as set forth in claim 2, wherein said upper recesses are generally circular and are adapted to receive cylindrical cross bars, the body of the bracket providing sufficient stock to embrace substantially more than 180° of the circumference of the upper cross bars whereby the upper cross bars are radially locked in said truncated recesses.

4. A bracket as set forth in claim 1, wherein each of said cross bar recesses extend through the body of the bracket.

5. A bracket as set forth in claim 1, wherein said leg recesses are provided by cylindrical bosses, a web extending between said bosses, said lower cross bar recess extending through said web.

6. A bracket as set forth in claim 1, wherein said cross bar and said leg recesses are circular and of the same general size.

7. A bracket as set forth in claim 1, wherein said leg and lower recesses are provided by generally cylindrical bosses, said cylindrical bosses each being stabilized by reinforcing webs in perpendicular planes.

8. A work support unit convertible between work horse and buck horse modes, the unit comprising a set of three generally horizontal cross bars, four depending legs and bracket means, said bracket means coupling the cross bars and legs and maintaining the same in a fixed spatial relationship, said spatial relationship including two of the cross bars in an upper horizontal plane in spaced parallel relation and the third cross bar in a lower horizontal plane and a vertical plane centered between the upper two cross bars, said legs being arranged in pairs at opposite ends of the cross bars, each pair of legs lying in a plane forming an obtuse angle with the horizontal direction of said cross bars, the planes of said legs diverging from one another with increasing distance from the cross bars, the legs of a pair diverging from one another with increasing distance from the cross bars, the upper two cross bars each being bent into substantially identical shallow V-shapes adapted to stably support a cylindrical object, the lowermost regions of the V-shapes being spaced above the plane of the lower cross bar to permit a plank to be inserted therebetween, the brackets being arranged to receive the legs and retain the same with a friction fit whereby said legs are readily assembled with and removable from said brackets, the lower cross bar having a cross section of a size that forms a convenient hand grip for carrying the unit when the legs are removed from the brackets.

9. A work support unit as set forth in claim 8, wherein said cross bars and legs are all fabricated from stock of the same cross section.

10. A work support unit as set forth in claim 9, wherein said cross bars and legs are formed of round tubing stock.

11. A work support unit as set forth in claim 9, wherein said brackets each provide five individual recesses, one for each of said cross bars and the associated pair of legs.

* * * * *